United States Patent
Li et al.

(10) Patent No.: US 10,070,333 B2
(45) Date of Patent: Sep. 4, 2018

(54) MEASUREMENT METHOD FOR CHANNEL STATE INFORMATION, USER EQUIPMENT AND BASE STATION

(71) Applicant: FUJITSU LIMITED, Kawasaki-shi, Kanagawa (JP)

(72) Inventors: Hongchao Li, Beijing (CN); Hua Zhou, Beijing (CN); Jianming Wu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 75 days.

(21) Appl. No.: 14/226,452

(22) Filed: Mar. 26, 2014

(65) Prior Publication Data

US 2014/0204790 A1 Jul. 24, 2014

Related U.S. Application Data

(63) Continuation of application No. PCT/CN2011/080278, filed on Sep. 28, 2011.

(51) Int. Cl.
 *H04W 24/10* (2009.01)
 *H04L 5/00* (2006.01)

(52) U.S. Cl.
 CPC ........... *H04W 24/10* (2013.01); *H04L 5/0035* (2013.01); *H04L 5/0057* (2013.01)

(58) Field of Classification Search
 CPC ......... H04W 52/0206; H04W 52/0216; H04W 28/0221; H04W 28/02
 See application file for complete search history.

(56) References Cited

U.S. PATENT DOCUMENTS 8,917,614 B2 12/2014 Luo et al.
2009/0270108 A1 10/2009 Xu
(Continued)

FOREIGN PATENT DOCUMENTS

CN 101848485 A 9/2010
CN 101873671 A 10/2010
(Continued)

OTHER PUBLICATIONS

International search report issued for corresponding international application No. PCT/CN2011/080278, dated Jun. 28, 2012.
(Continued)

*Primary Examiner* — Lakeram Jangbahadur
(74) *Attorney, Agent, or Firm* — Myers Wolin, LLC

(57) ABSTRACT

Embodiments of the present invention provide a measurement method for channel state information, user equipment and a base station. The measurement method includes: selecting one or more coordinated transmission points for coordinated multipoint transmission by the base station for user equipment; and independently configuring a measurement subset used for channel state information feedback for each base station and each coordinated transmission point, so that the user equipment performs measurement according to the measurement subset. With the embodiments of the present invention, channel state information feedback configuration is performed to each cell or transmission point participated in coordination, and a unified structural design for feedback information may be used, so that channel feedback information for multiple transmission points or multiple cells can serve for not only transmission of a single cell, but also transmission of multiple cells.

9 Claims, 5 Drawing Sheets

(56) References Cited

U.S. PATENT DOCUMENTS

| | | | |
|---|---|---|---|
| 2010/0271968 A1 | 10/2010 | Liu et al. | |
| 2010/0323720 A1* | 12/2010 | Jen | H04B 7/2606 |
| | | | 455/456.1 |
| 2011/0188393 A1* | 8/2011 | Mallik | H04B 7/024 |
| | | | 370/252 |
| 2012/0076038 A1 | 3/2012 | Shan et al. | |
| 2012/0188904 A1 | 7/2012 | Koo et al. | |
| 2012/0307922 A1* | 12/2012 | Simonsson | H04W 24/10 |
| | | | 375/260 |

FOREIGN PATENT DOCUMENTS

| | | | | |
|---|---|---|---|---|
| CN | 101888665 | A | 11/2010 | |
| CN | 102075983 | * | 5/2011 | H04W 24/02 |
| CN | 102075983 | A | 5/2011 | |
| JP | 2013-519315 | A | 5/2013 | |
| KR | 10-2011-0035807 | A | 4/2011 | |
| WO | 2010/134792 | A2 | 11/2010 | |
| WO | 2011/094633 | A2 | 8/2011 | |
| WO | 2011/097523 | A1 | 8/2011 | |
| WO | 2011/115421 | A2 | 9/2011 | |

OTHER PUBLICATIONS

Notice of Preliminary Rejection issued for corresponding Korean Patent Application No. 10-2014-7009156, dated Feb. 16, 2015, with English translation.

Office Action issued by the Canadian Intellectual Property Office for corresponding Canadian Patent Application No. 2,847,823, dated Jul. 16, 2015.

Extended European search report with supplementary European search report and the European search opinion issued by the European Patent Office for corresponding European Patent Application No. 11873018.3, dated Jun. 29, 2015.

Panasonic, "Operation of Traffic Offloading in RRH-based Heterogeneous Network and Possible Spec Impact", Agenda Item: 6.5.2, 3GPP TSG-RAN WG1 Meeting #66, R1-112360, Athens, Greece, Aug. 22-26, 2011.

Office Action issued by the Japan Patent Office for corresponding Japanese Patent Application No. 2014-532203, dated Sep. 1, 2015, with an English translation.

Motorola Mobility, "Standardization Impact of CoMP Coordinated Scheduling Schemes", Agenda Item: 6.5.2, 3GPP TSG-RAN1 Meeting #66, R1-112442, Athens, Greece, Aug. 22-26, 2011.

Office Action issued by Rospatent Federal Service for Intellectual Property for corresponding Russian Patent Application No. 2014117013/07(026823), dated Dec. 3, 2015, with an English translation.

Office Action issued by the Canadian Intellectual Property Office for corresponding Canadian Patent Application No. 2,847,823, dated Jun. 2, 2016.

First Office Action issued by the Japan Patent Office for corresponding Japanese Patent Application No. 2016-090802, dated Jan. 4, 2017, with an English translation.

First Notification of Office Action issued by the State Intellectual Property Office of China for corresponding Chinese Patent Application No. 201180073025.9, dated Oct. 8, 2016, with an English translation.

Search Report issued by the State Intellectual Property Office of China for corresponding Chinese Patent Application No. 201180073025.9, dated Oct. 8, 2016, with an English translation.

Office Action issued by the Canadian Intellectual Property Office for corresponding Canadian Patent Application No. 2,847,823, dated May 26, 2017.

Notification of Reasons for Refusal issued by the Japan Patent Office for corresponding Japanese Patent Application No. 2016-090802, dated Dec. 5, 2017, with an English translation.

Potevio, "Considerations on RRH subset selection mechanism", Agenda Item: 6.6.3, 3GPP TSG-RAN WG1 Meeting #66, R1-112582, Athens, Greece, Aug. 22-26, 2011.

* cited by examiner

MEASUREMENT METHOD FOR CHANNEL STATE INFORMATION, USER EQUIPMENT AND BASE STATION

CROSS-REFERENCE TO RELATED APPLICATIONS

This is a continuation of International Application No. PCT/CN2011/080278, filed on Sep. 28, 2011, the contents of which are herein wholly incorporated by reference.

TECHNICAL FIELD

The present invention relates to the field of communications, and in particular to a measurement method for channel state information, user equipment and a base station.

BACKGROUND

In a long-term evolution-advance (LTE-A) system, transmission nodes of low power are introduced on a basis of a conventional homogeneous network, so as to constitute a heterogeneous network, which includes a Macro cell, a Femto cell, a Pico cell, a remote radio head (RRH), and a relay.

In order to improve cell coverage and user's experience and increase throughput of an LTE-A system and a data transmission rate of a user, a coordinated multiple points (CoMP) technology has been introduced. Such a technology is to coordinate with a user in data transmission by using multiple geographically distributed transmission points, thereby improving performance of a cell-edge user and coverage of the cell, increasing throughput of the cell edge and the throughput of the system, and improving user's experience.

In the CoMP technology, different transmission points in a same cell may coordinate in transmission. FIG. 1 is a schematic diagram of coordination of different transmission points in the same cell in a CoMP system. As shown in FIG. 1, an eNB 101 and an RRH 102 in the same cell may coordinate to serve for user equipment 104, and the eNB 101 and an RRH 103 may coordinate to serve for user equipment 105.

Furthermore, different transmission points in different cells may coordinate in transmission. FIG. 2 is a schematic diagram of coordination of different transmission points in different cells in a CoMP system. As shown in FIG. 2, eNB/RRH 201 and eNB/RRH 202 in different cells may coordinate to serve for user equipment 203.

In order to select an optimal transmission point, a base station side needs to obtain information on a downlink from each transmission point to user equipment, usually including channel quality information (CQI), a precoding matrix index (PMI) and a rank, so as to select one or more optimal transmission points according to an optimization rule. In order to ensure backward compatibility and more flexible scheduling, the base station side needs have an ability of turning back to a single-point transmission of a conventional cellular network, which requires the user, in feeding back channel information, to report not only downlink channel information in CoMP transmission, but also downlink channel information in conventional single-point transmission.

Some heterogeneous network nodes different from a conventional cellular network are introduced into a heterogeneous network. Such heterogeneous network nodes, such a home eNodeB (HeNB), and a hot spot covered Pico cell, etc., use relatively low transmission power to cover a specific zone or user, with a relatively flexible manner of networking. If deployed reasonably, a user's experience will be increased to a relatively large extent. And in a Macro-Pico scenario, an almost blank subframe (ABS) is introduced into a standard for inter-cell enhanced interference coordination and interference cancellation (eICIC).

However, in the implementation of the embodiments of the present invention, the inventors found that only two measurement reference resource subsets are used in the existing channel state information feedback, and no individual channel state information feedback is configured for each cell or transmission point participated in coordination.

FIG. 3 is a schematic diagram of relationship between an ABS and a measurement subset in the relevant art. As shown in FIG. 3, one measurement subset (measurement subset 0) corresponds to an ABS, and another measurement subset (measurement subset 1) corresponds to a normal subframe.

Therefore, a unified structural design for feedback information is not used in the existing CoMP technologies, that is, channel feedback information for multiple transmission points or multiple cells cannot serve for not only transmission of a single cell but also transmission of multiple cells.

It should be noted that the above description of the background is merely provided for clear and complete explanation of the present invention and for easy understanding by those skilled in the art. And it should not be understood that the above technical solution is known to those skilled in the art as it is described in the background of the present invention.

SUMMARY

Embodiments of the present invention provide a measurement method for channel state information, user equipment and a base station, with an object being to using a unified structural design for feedback information to make channel feedback information for multiple transmission points or multiple cells be capable of serving for not only transmission of a single cell but also transmission of multiple cells.

According to one aspect of the embodiments of the present invention, there is provided a measurement method for channel state information, applicable to a base station in a coordinated multipoint system, the measurement method including:

a coordinated point selecting process for selecting, by the base station for user equipment, one or more coordinated transmission points for coordinated multipoint transmission; and a measurement subset configuring process for independently configuring a measurement subset used for channel state information feedback for the base station and each coordinated transmission point, so that the user equipment performs measurement according to the measurement subset.

According to another aspect of the embodiments of the present invention, there is provided a measurement method for channel state information, applicable to user equipment in a coordinated multipoint system, the measurement method including:

an information measuring process for individually measuring, by the user equipment, channel state information of each base station or coordinated transmission point according to a measurement subset of the base station or the coordinated transmission point.

According to a further aspect of the embodiments of the present invention, there is provided a base station, including:

a coordinated point selecting unit, configured to select one or more coordinated transmission points for coordinated multipoint transmission for user equipment; and a measurement subset configuring unit, configured to independently configure a measurement subset used for channel state information feedback for the base station and each coordinated transmission point, so that the user equipment performs measurement according to the measurement subset.

According to still another aspect of the embodiments of the present invention, there is provided user equipment, including:

an information measuring unit, configured to individually measure channel state information of each base station or coordinated transmission point according to a measurement subset of the base station or the coordinated transmission point.

According to still another aspect of the embodiments of the present invention, there is provided a computer-readable program, wherein when the program is executed in a base station, the program enables a computer to carry out the measurement method for channel state information as described above in the base station.

According to still another aspect of the embodiments of the present invention, there is provided a storage medium in which a computer-readable program is stored, wherein the computer-readable program enables a computer to carry out the measurement method for channel state information as described above in a base station.

According to still another aspect of the embodiments of the present invention, there is provided a computer-readable program, wherein when the program is executed in user equipment, the program enables a computer to carry out the measurement method for channel state information as described above in the user equipment.

According to still another aspect of the embodiments of the present invention, there is provided a storage medium in which a computer-readable program is stored, wherein the computer-readable program enables a computer to carry out the measurement method for channel state information as described above in user equipment.

The advantage of the embodiments of the present invention resides in that with the individual channel state information feedback configuration for each cell or transmission point participated in the coordination, a unified structural design for feedback information may be used, so that channel feedback information for multiple transmission points or multiple cells can serve for not only transmission of a single cell but also transmission of multiple cells.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including/comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be enlarged or reduced.

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

Figure 1:
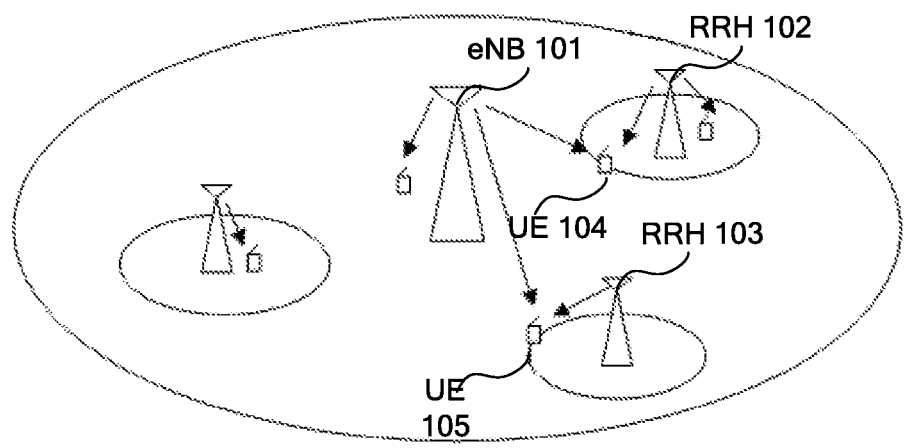
FIG. 1 is a schematic diagram of coordination of different transmission points in the same cell in a CoMP system.
Figure 2:
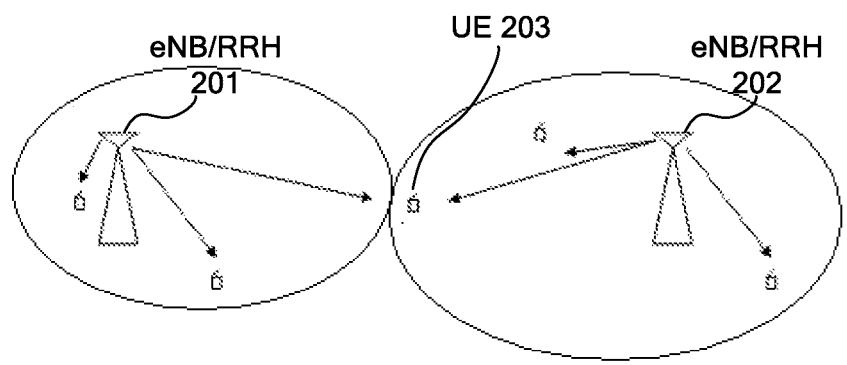
FIG. 2 is a schematic diagram of coordination of different transmission points in different cells in a CoMP system.
Figure 3:
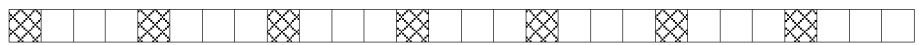
FIG. 3 is a schematic diagram of relationship between an ABS and a measurement subset in the relevant art.
Figure 3:
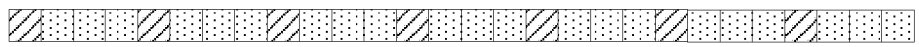

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Currently, a CoMP transmission scheme includes joint processing (JP) and coordination scheduling/beamforming (CS/CB). The former denotes that a plurality of transmission points have data to be transmitted to user equipment at the same time, and one or more of the plurality of transmission points are dynamically selected to transmit data to the user equipment. And the latter denotes that there is only one transmission point transmitting data to user equipment; wherein, the transmission points may be a conventional Macro cellular base station or RRH, and may also be a heterogeneous network node, which may be a high-power node, and may also be a low-power node.

Feedback information of users in different CoMP technologies is not completely identical, but needs to feed back CSI in conventional single-point transmission (non-CoMP transmission) and CSI in CoMP transmission. For the JP transmission, a received signal may be expressed by a formula below:

$$y_k = \left(\sum_{b=1}^{B} H_k^{(b)} W_k^{(b)}\right) x_k + n_k; \quad (1)$$

where, $W_k^{(b)}$ is a precoding matrix used by a coordinated transmission point b in JP transmission, $H_k^{(b)}$ is a channel from the coordinated transmission point b to a user, $x_k$ is transmitted data, and $n_k$ is a noise.

The user is needed to respectively feed back the precoding matrix $W_k^{(b)}$ of each transmission point, and feed back a quantized signal to noise ratio to which formula (1) corresponds, that is, CQI, which is based on a reported precoding matrix. And at the same time, the user is also needed to feed back CSI in only single-point transmission, that is, a precoding matrix and a quantized signal to noise ratio to which formula (2) corresponds.

$$y_k = H_k^{(s)} W_k^{(s)} x_k + n_k \quad (2)$$

When the CoMP is applied to a heterogeneous network, a possible scenario is that the eICIC and the CoMP operate at the same time. At this moment, part of Macro base stations may be configured with ABSs, and following case may occur: when CoMP is implemented in the ABSs, that is, when multiple transmission points or cells perform coordinated transmission, at least one of the cells or transmission points is configured with ABSs; or, when CoMP is implemented in non-ABS, that is, when multiple transmission points or cells perform coordinated transmission, no cell or transmission point is configured with an ABS. As for the above cases, there exists no processing scheme of measurement reference resource of multiple cells in a CoMP system.

Figure 4:
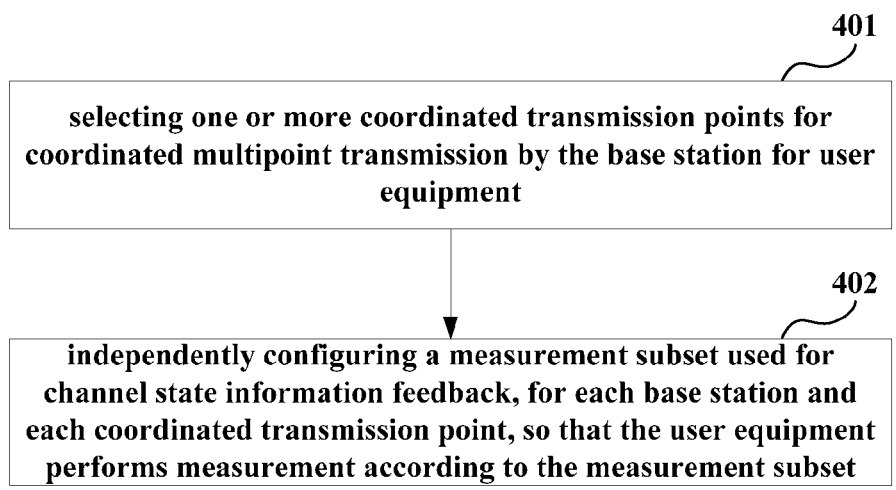
FIG. 4 is a flowchart of the measurement method of an embodiment of the present invention.

An embodiment of the present invention provides a measurement method for channel state information. FIG. 4 is a flowchart of the measurement method of the embodiment of the present invention. As shown in FIG. 4, at a base station side of a CoMP system, the method includes:

step 401: selecting one or more coordinated transmission points for coordinated multipoint transmission by the base station for user equipment; and step 402: independently configuring a measurement subset used for channel state information feedback, for each base station and each coordinated transmission point, so that the user equipment performs measurement according to the measurement subset(s).

In this embodiment, the base station should be understood as a network side base station in a broad sense, which may be a Macro cell base station, a Pico cell base station, or an RRH. A coordinated transmission point may include an individual cell or base station, or an RRH, or an antenna port, etc. However, it is not limited thereto, and a particular type may be determined as actually required.

In this embodiment, both the base station and each coordinated transmission point may be configured with a measurement subset. The measurement subset may indicate that reference symbols in which resources (including time domain and frequency domain) may be used by the user equipment for channel estimation and signal to noise ratio measurement;

wherein, the measurement subset of the base station may include resource information corresponding to ABSs of one or more coordinated transmission points; and the measurement subset of the coordinated transmission point may include resource information corresponding to ABSs of other coordinated transmission points and the base station.

Therefore, a unified structural design for feedback information may be used by performing individual channel state information feedback configuration on each cell or transmission point participated in coordination. And CSI measurement may be performed to a resource on which the interference is as small as possible, thereby increasing the precision and flexibility of the feedback, and lowering downlink overhead.

Figure 5:
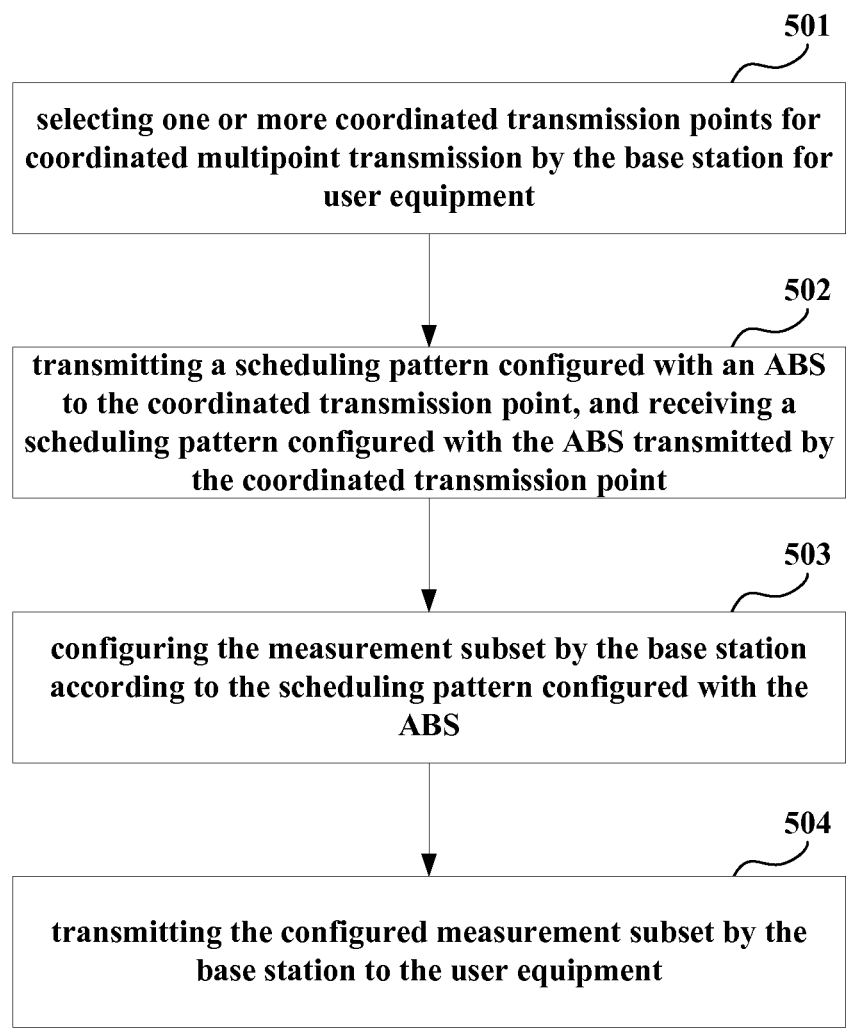
FIG. 5 is another flowchart of the measurement method of an embodiment of the present invention.

FIG. 5 is another flowchart of the measurement method of an embodiment of the present invention. As shown in FIG. 5, the method includes:

step 501: selecting one or more coordinated transmission points for coordinated multipoint transmission by the base station for user equipment;

step 502: transmitting a scheduling pattern configured with an ABS to the coordinated transmission point, and receiving a scheduling pattern configured with the ABS transmitted by the coordinated transmission point;

in this embodiment, both the base station and the coordinated transmission point may have a scheduling pattern configured with an ABS (ABS pattern), and the base station and each transmission point may interact respective scheduling patterns configured with an ABS, which may be realized by using the relevant art, and shall not be described herein any further;

step 503: configuring the measurement subset by the base station according to the scheduling pattern configured with the ABS.

In this embodiment, the base station and each transmission point may be configured with a measurement subset according to the scheduling pattern configured with the ABS; wherein, the measurement subset of the base station may include resource information corresponding to ABSs of one or more coordinated transmission points; and the measurement subset of the coordinated transmission point may include resource information corresponding to ABSs of other coordinated transmission points and the base station.

The configuration of a measurement subset shall be described below in detail taking that cell #1 corresponds to the base station, and cell #2 and cell #3 correspond to coordinated transmission points as an example; wherein, UE #1 belongs to cell #1, and cell #2, cell #3 and cell #1 coordinate at the same time in transmission for UE #1. Cell #1 is configured with ABS pattern P#1, cell #2 is configured with ABS pattern P#2, and cell #3 is configured with ABS pattern P#3.

Then, the measurement subset of cell #1 configured by cell #1 for UE #1 may be (P#2∩P#3), the measurement subset of cell #2 configured by cell #1 for UE #1 may be (P#1∩P#3), and the measurement subset of cell #3 configured by cell #1 for UE #1 may be (P#1∩P#2).

For example, P#1 may particularly be:
"101010101010101010101010101010101010";
P#2 may particularly be:
"100010001000100010001000100010001000";
and P#3 may particularly be:
"100000010000000100000001000000010000000";
where, 0 denotes resource information corresponding to an normal subframe, and 1 denotes resource information corresponding to an ABS; hence, the measurement subset (P#2∩P#3) of cell #1 configured for UE #1 may be:
"100000010000000100000001000000010000000";
the measurement subset (P#1∩P#3) of cell #2 configured for UE #1 may be:
"100000010000000100000001000000010000000";

and the measurement subset (P#1∩P#2) of cell #3 configured for UE #1 may be:

"100010001000100010001000100010001000".

The use of the method in this embodiment of the present invention may make the interference between the three cells be as small as possible when the UE performs channel measurement, thereby reducing the error of the channel measurement. And more cell ABS patterns may be taken into consideration in the configuration of individual pattern of each cell, thereby selecting a relatively optimized measurement reference resource.

And if such a manner is used, downlink muting performed for avoidance of interference (such as interference to a CSI-RS) may be reduced, thereby lowering downlink overhead.

It should be noted that the above examples exemplarily describe only an embodiment of configuring a measurement subset. However, the present invention is not limited thereto. For example, the measurement subset of cell #1 configured for UE #1 may also be configured as P #2, that is, only resource information corresponding to the ABS of cell #2 is contained, and resource information corresponding to the ABS of cell #3 is not contained.

Furthermore, in particular implementation, the base station or the transmission point may configure a corresponding measurement subset of their own. For example, cell #1 configures UE #1 with the measurement subset of cell #1, cell #2 configures UE #1 with the measurement subset of cell #2, and cell #3 configures UE #1 with the measurement subset of cell #3.

In this embodiment, as shown in FIG. 5, after step 503, the method may further include:

step 504: transmitting the configured measurement subset by the base station to the user equipment.

In particular implementation, the base station may transmit the measurement subset to the user equipment via high-layer signaling, so that the user equipment performs measurement according to the measurement subset and reports periodically.

Or, in particular implementation, the base station may also transmit the measurement subset to the user equipment via downlink control information (DCI), so as to trigger the user equipment to perform measurement according to the measurement subset and report aperiodically.

Furthermore, in particular implementation, if a measurement subset is configured by the base station or the coordinated transmission point itself in step 503, the base station or the coordinated transmission point may transmit a corresponding measurement subset to the user equipment by itself, so as to trigger the user equipment to perform measurement and report periodically or aperiodically.

An embodiment of the present invention further provides a base station, with the contents identical to those of the measurement method for channel state information being not described herein any further. It should be noted that the base station should be understood as a network side base station in a broad sense, which may be a Macro cell base station, a Pico cell base station, or an RRH, etc.

Figure 6:
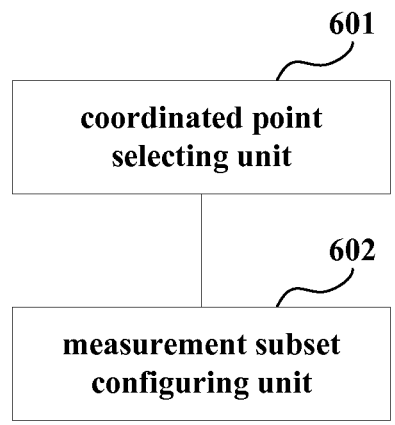
FIG. 6 is a schematic diagram of the structure of a base station of an embodiment of the present invention.

FIG. 6 is a schematic diagram of the structure of a base station of an embodiment of the present invention. As shown in FIG. 6, the base station includes: a coordinated point selecting unit 601 and a measurement subset configuring unit 602;

wherein, the coordinated point selecting unit 601 is configured to select one or more coordinated transmission points for coordinated multipoint transmission for user equipment, and the measurement subset configuring unit 602 is configured to configure a measurement subset used for channel state information feedback for the base station and each coordinated transmission point, so that the user equipment performs measurement according to the measurement subset;

wherein, the measurement subset of the base station may include resource information corresponding to an ABS of the coordinated transmission point, and the measurement subset of the coordinated transmission point may includes resource information corresponding to ABSs of other coordinated transmission points and the base station.

Figure 7:
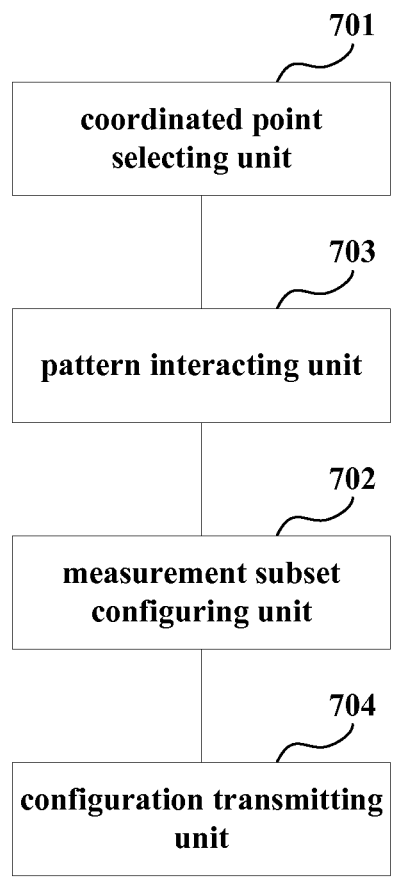
FIG. 7 is another schematic diagram of the structure of a base station of an embodiment of the present invention.

FIG. 7 is another schematic diagram of the structure of a base station of an embodiment of the present invention. As shown in FIG. 7, the base station includes: a coordinated point selecting unit 701 and a measurement subset configuring unit 702, as described above.

As shown in FIG. 7, the base station may further include a pattern interacting unit 703; wherein, the pattern interacting unit 703 is configured to transmit a scheduling pattern configured with an ABS to the coordinated transmission point, and receive the scheduling pattern configured with the ABS transmitted by the coordinated transmission point;

and the measurement subset configuring unit 702 is further configured to configure the measurement subset according to the scheduling pattern configured with the ABS.

As shown in FIG. 7, the base station may further include a configuration transmitting unit 704; wherein, the configuration transmitting unit 704 is configured to transmit the measurement subset to the user equipment via high-layer signaling, so that the user equipment performs measurement according to the measurement subset and reports periodically.

Or, the configuration transmitting unit 704 transmits the measurement subset to the user equipment via downlink control information, so as to trigger the user equipment to perform measurement according to the measurement subset and reports aperiodically.

It can be seen from the above embodiment that at the base station side, a unified structural design for feedback information may be used by performing individual channel state information feedback configuration on each cell or transmission point participated in coordination, so that channel feedback information for multiple transmission points or multiple cells can serve for not only transmission of a single cell but also transmission of multiple cells. And CSI measurement may be performed to a resource on which the interference is as small as possible, thereby increasing the precision and flexibility of the feedback, and lowering downlink overhead.

An embodiment of the present invention provides a measurement method for channel state information, applicable to a user equipment side in a coordinated multipoint system; wherein, the contents identical to those of the base station side shall not be described herein any further.

Figure 8:
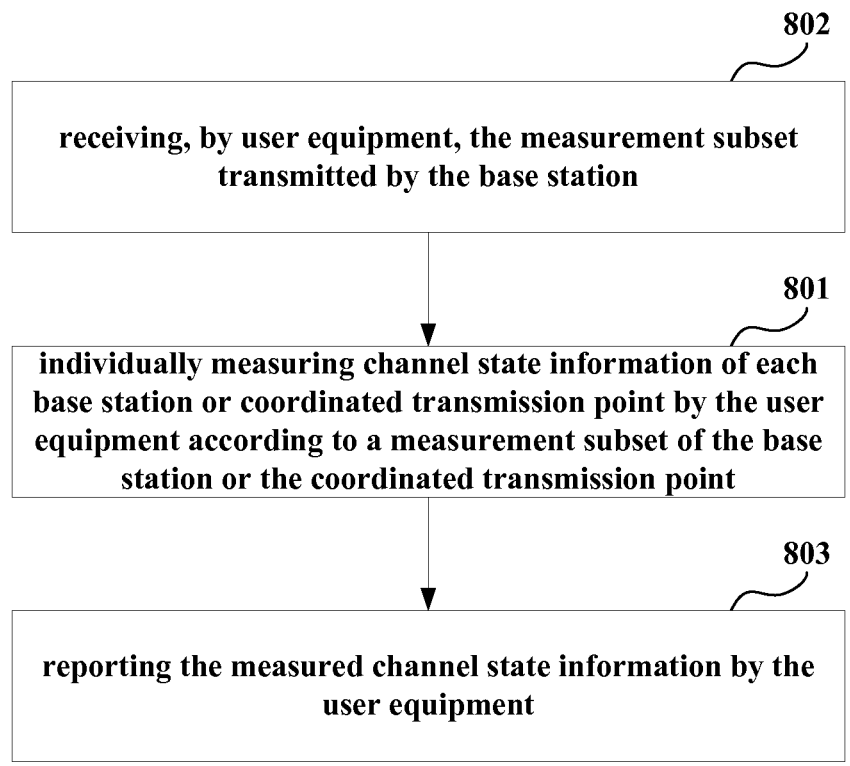
FIG. 8 is still another flowchart of the measurement method of an embodiment of the present invention.

FIG. 8 is still another flowchart of the measurement method of an embodiment of the present invention. As shown in FIG. 8, at a user equipment side of a CoMP system, the method includes:

step 801: individually measuring channel state information of each base station or coordinated transmission point by the user equipment according to a measurement subset of the base station or the coordinated transmission point;

wherein the measurement subset of the base station may include resource information corresponding to an ABS of the coordinated transmission point, and the measurement subset of the coordinated transmission point may include resource information corresponding to ABSs of other coordinated transmission points and the base station.

Furthermore, as shown in FIG. 8, before performing information measurement in step 801, the measurement method may further include:

step 802: receiving the measurement subset transmitted by the base station.

Furthermore, as shown in FIG. 8, after performing information measurement in step 801, the measurement method may further include:

step 803: reporting the measured channel state information by the user equipment.

In particular implementation, in step 802, the user equipment may receive the measurement subset transmitted by the base station via high-layer signaling. And in step 803, the user equipment reports periodically the measured channel state information.

Or, particular implementation, in step 802, the user equipment may receive the measurement subset transmitted by the base station via downlink control information. And in step 803, the user equipment reports aperiodically the measured channel state information.

In this embodiment, the periodic or aperiodic report may be performed in a time sequence provided in an existing standard, which shall not be described herein any further.

An embodiment of the present invention provides user equipment, with the contents identical to those of the measurement method for channel state information being not described herein any further.

Figure 9:
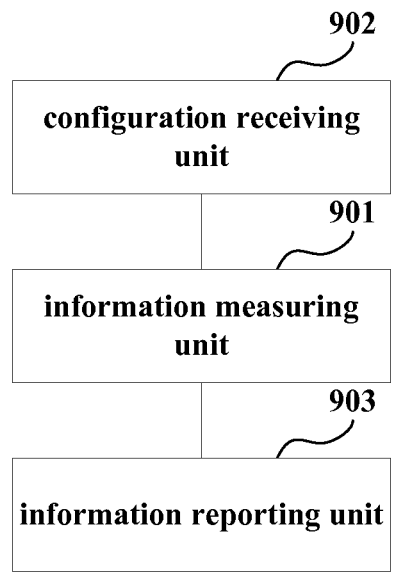
FIG. 9 is a schematic diagram of the structure of user equipment of an embodiment of the present invention.

FIG. 9 is a schematic diagram of the structure of user equipment of an embodiment of the present invention. As shown in FIG. 9, the user equipment includes an information measuring unit 901; wherein, the information measuring unit 901 is configured to individually measure channel state information of each base station or coordinated transmission point according to a measurement subset of the base station or the coordinated transmission point;

wherein the measurement subset of the base station may include resource information corresponding to an ABS of the coordinated transmission point, and the measurement subset of the coordinated transmission point may include resource information corresponding to ABSs of other coordinated transmission points and the base station.

Furthermore, as shown in FIG. 9, the user equipment may include a configuration receiving unit 902; wherein, the configuration receiving unit 902 is configured to receive the measurement subset transmitted by the base station via high-layer signaling, or receive the measurement subset transmitted by the base station via downlink control information.

Furthermore, as shown in FIG. 9, the user equipment may include an information reporting unit 903; wherein, the information reporting unit 903 is configured to periodically or aperiodically report the measured channel state information.

It can be seen from the above embodiment that at the user equipment side, a unified structural design for feedback information may be used by performing individual channel state information measurement on each cell or transmission point participated in coordination, so that channel feedback information for multiple transmission points or multiple cells can serve for not only transmission of a single cell but also transmission of multiple cells. And CSI measurement may be performed to a resource on which the interference is as small as possible, thereby increasing the precision and flexibility of the feedback, and lowering downlink overhead.

An embodiment of the present invention further provides a computer-readable program, wherein when the program is executed in a base station, the program enables a computer to carry out the measurement method for channel state information as described above in the base station.

An embodiment of the present invention further provides a storage medium in which a computer-readable program is stored, wherein the computer-readable program enables a computer to carry out the measurement method for channel state information as described above in a base station.

An embodiment of the present invention further provides a computer-readable program, wherein when the program is executed in user equipment, the program enables a computer to carry out the measurement method for channel state information as described above in the user equipment.

An embodiment of the present invention further provides a storage medium in which a computer-readable program is stored, wherein the computer-readable program enables a computer to carry out the measurement method for channel state information as described above in user equipment.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. A measurement method for channel state information, applicable to a base station in a coordinated multipoint system, the measurement method comprising:

a coordinated point selecting process for selecting, by the base station for user equipment, one or more coordinated transmission points for coordinated multipoint transmission;

a measurement subset configuring process for independently configuring a measurement subset used for channel state information feedback for each base station and each coordinated transmission point, the user equipment individually measure channel state information of each base station or coordinated transmission point according to the measurement subsets, wherein the measurement subset indicates that reference symbols in which resource are used by the user equipment for carrying out the measurement; and a configuration transmitting process for transmitting information of the measurement subsets to the user equipment via high-layer signaling, the user equipment performs measurement according to the measurement subset and reports periodically, or, transmitting information of the measurement subset to the user equipment via downlink control information, to trigger the user equipment to perform measurement according to the measurement subset and report aperiodically, wherein the measurement subset of the base station comprises resource information corresponding to an almost blank subframe of at least one of the coordinated transmission points.

2. The measurement method according to claim 1, wherein the measurement subset of the coordinated transmission point comprises resource information corresponding to almost blank subframes of other coordinated transmission points and the base station.

3. The measurement method according to claim 2, wherein before the measurement subset configuring process, the measurement method further comprises:

a pattern interacting process for transmitting a scheduling pattern configured with an almost blank subframe to the coordinated transmission point, and receiving a scheduling pattern configured with the almost blank subframe transmitted by the coordinated transmission point;

and in the measurement subset configuring process, configuring the measurement subset according to the scheduling pattern configured with the almost blank subframe.

4. A base station, comprising:

a coordinated point selecting unit, configured to select one or more coordinated transmission points for coordinated multipoint transmission for user equipment;

a measurement subset configuring unit, configured to independently configure a measurement subset used for channel state information feedback for each base station and each coordinated transmission point, the user equipment individually measure channel state information of each base station or coordinated transmission point according to the measurement subsets, wherein the measurement subset indicates that reference symbols in which resource are used by the user equipment for carrying out the measurement; and a configuration transmitting unit, configured to transmit information of the measurement subset to the user equipment via high-layer signaling, the user equipment performs measurement according to the measurement subset and reports periodically, or, the configuration transmitting unit is configured to transmit information of the measurement subset to the user equipment via downlink control information, to trigger the user equipment to perform measurement according to the measurement subset and reports aperiodically, wherein the measurement subset of the base station comprises resource information corresponding to an almost blank subframe of at least one of the coordinated transmission points.

5. The base station according to claim 4, wherein the measurement subset of the coordinated transmission point comprises resource information corresponding to almost blank subframe of other coordinated transmission points and the base station.

6. The base station according to claim 5, wherein the base station further comprises:

a pattern interacting unit, configured to transmit a scheduling pattern configured with an almost blank subframe to the coordinated transmission point, and receive a scheduling pattern configured with the almost blank subframe transmitted by the coordinated transmission point;

and the measurement subset configuring unit is configured to configure the measurement subset according to the scheduling pattern configured with the almost blank subframe.

7. User equipment, comprising:

an information measuring unit, configured to individually measure channel state information of each base station or coordinated transmission point according to a measurement subset of the base station or the coordinated transmission point, when the user equipment is configured to feed back multiple channel status information reports for multiple transmission points for usage of coordinated multipoint transmission, wherein the measurement subset indicates that reference symbols in which resource are used by the user equipment for carrying out the measurement; and a configuration receiving unit, configured to receive information of the measurement subset transmitted by the base station via high-layer signaling, or receive information of the measurement subset transmitted by the base station via downlink control information, wherein the measurement subset of the base station comprises resource information corresponding to an almost blank subframe of at least one of the coordinated transmission points.

8. The user equipment according to claim 7, wherein the measurement subset of the coordinated transmission point comprises resource information corresponding to almost blank subframes of other coordinated transmission points and the base station.

9. The user equipment according to claim 8, wherein the user equipment further comprises:

an information reporting unit, configured to periodically or aperiodically report the measured channel state information of radio channels between the user equipment and each base station or coordinated transmission point.

* * * * *